United States Patent
Deng et al.

(10) Patent No.: US 9,404,790 B2
(45) Date of Patent: Aug. 2, 2016

(54) TANK WEIGHING TRANSDUCER

(71) Applicants: Pingyuan Deng, Guangdong (CN); Xiaobo Ai, Guangdong (CN); Jian Wang, Guangdong (CN); Chengzuo Wei, Guangdong (CN)

(72) Inventors: Pingyuan Deng, Guangdong (CN); Xiaobo Ai, Guangdong (CN); Jian Wang, Guangdong (CN); Chengzuo Wei, Guangdong (CN)

(73) Assignee: Aleph America corporation, Reno, NV (US)

( * ) Notice: Subject to any disclaimer, the term of this patent is extended or adjusted under 35 U.S.C. 154(b) by 227 days.

(21) Appl. No.: 14/131,201

(22) PCT Filed: Apr. 27, 2013

(86) PCT No.: PCT/CN2013/074852
§ 371 (c)(1),
(2) Date: Jan. 6, 2014

(87) PCT Pub. No.: WO2013/189207
PCT Pub. Date: Dec. 27, 2013

(65) Prior Publication Data
US 2014/0166374 A1  Jun. 19, 2014

(30) Foreign Application Priority Data
Jun. 21, 2012 (CN) .......................... 2012 2 0296045

(51) Int. Cl.
*G01G 21/28* (2006.01)
*G01G 17/04* (2006.01)

(52) U.S. Cl.
CPC ................ *G01G 21/28* (2013.01); *G01G 17/04* (2013.01); *Y10T 29/49002* (2015.01)

(58) Field of Classification Search
CPC ... G01G 17/04; G01G 21/28; Y10T 29/49002
See application file for complete search history.

(56) References Cited

U.S. PATENT DOCUMENTS

| 3,894,591 | A | * | 7/1975 | Ackeret | G01G 19/56 177/126 |
|---|---|---|---|---|---|
| 4,524,617 | A | * | 6/1985 | Krehel | F17C 13/023 126/41 R |
| 5,555,764 | A | * | 9/1996 | Dybas | F17C 13/023 177/208 |
| 6,978,671 | B1 | * | 12/2005 | Meggs | G01F 23/20 177/180 |
| 7,267,001 | B1 | * | 9/2007 | Stein | G01F 23/20 177/136 |
| 2001/0032504 | A1 | * | 10/2001 | Moseley | G01F 23/20 73/290 R |
| 2005/0126277 | A1 | * | 6/2005 | Nelson | G01F 22/02 73/149 |

(Continued)

*Primary Examiner* — Peter Macchiarolo
*Assistant Examiner* — Natalie Huls
(74) *Attorney, Agent, or Firm* — Joe Zheng

(57) ABSTRACT

A tank weighing transducer is described. In one embodiment, it comprises: a supporting ring, a cover, a gasket, a locking screw, a weighing sensor, a circuit board, a battery, a base, a supporter nut, a supporter screw, and a detachable supporter. The supporting ring and the cover are connected via the locking screw and the gasket. The weighing sensor and the circuit board are fixed on the base via the locking screw. The battery is put in a battery container on the base. The cover and the base are connected via the locking screw and the detachable supporter is fixed on the base via the supporter nut and the supporter screw. The tank weighing transducer is designed to withstand load for a long period, and has a good impact resistance. In addition, the tank weighing transducer is applicable for weighing the tank automatically for the long period.

8 Claims, 3 Drawing Sheets

(56) References Cited

U.S. PATENT DOCUMENTS

| | | | | |
|---|---|---|---|---|
| 2007/0255182 A1* | 11/2007 | Werner | ............... | F17C 13/023 600/584 |
| 2010/0064797 A1* | 3/2010 | Hirao | ............... | A61B 5/208 73/198 |
| 2010/0089152 A1* | 4/2010 | Kolada | ............... | G01F 19/00 73/426 |
| 2011/0100110 A1* | 5/2011 | Hong | ............... | F17C 13/00 73/149 |
| 2014/0296746 A1* | 10/2014 | Whitaker | ............... | A61B 5/208 600/584 |
| 2014/0311239 A1* | 10/2014 | Marjanovic | ............... | G01F 23/20 73/296 |
| 2015/0060155 A1* | 3/2015 | Michaluk, III | ............... | G01G 17/04 177/25.12 |

\* cited by examiner

TANK WEIGHING TRANSDUCER

CROSS REFERENCE OF RELATED APPLICATION

This is a U.S. National Stage under 35 U.S.C 371 of the International Application PCT/CN2013/074852, filed Apr. 27, 2013, which claims priority under 35 U.S.C. 119(a-d) to CN201220296045.4, filed Jun. 21, 2012.

BACKGROUND OF THE PRESENT INVENTION

1. Field of Invention

The present invention relates to the area of transducers and more particularly to a tank weighing transducer designed to work with load for a long period. In one embodiment, the tank weighing transducer regularly transfers a weight of the tank into a digital signal by a weighing sensor and sends the digital signal to a system unit by a wireless module.

2. Description of Related Arts

Nowadays, tanks and weighers in most conventional weighing devices with tank are provided separately. When the tank is weighed, the tank is put on the weigher, and then the weight is displayed on a display screen of the weigher. In this way, weighing the tank is labored, and the weight is inconvenient to read in the case that the tank shields the display screen. In addition, the weight of the tank cannot be detected regularly and automatically, and the conventional weighing devices cannot withstand impact force from the outside and weighing continuously with load for a long period.

SUMMARY OF THE PRESENT INVENTION

In order to solve problems in the conventional technology, the present invention is to provide a tank weighing transducer designed to detect a weight of the tank regularly and automatically for a long period, and bear the load continuously for the long period.

Accordingly, in order to accomplish the above object, the present invention provides a tank weighing transducer comprising: a supporting ring, a cover, a gasket, a locking screw, a weighing sensor, a circuit board, a battery, a base, a supporter nut, a supporter screw, and a detachable supporter. The supporting ring and the cover are connected via the locking screw and the gasket. The weighing sensor and the circuit board are fixed on the base via the locking screw. The battery is put in a battery container on the base. The cover and the base are connected via the locking screw, and the detachable supporter is fixed on the base via the supporter nut and the supporter screw. A weight of material in the tank changes as the material is consumed. In order to continuously monitor the weight of the material in the tank for a long period, the weighing sensor and the circuit board are programmed to detect the weight regularly at different intervals or detect the weight continuously. Then, the data detected is sent to a system unit via a wireless module provided on the circuit board in such a manner that the weight of the tank is monitored continuously for the long period.

The tank weighing transducer in the present invention is designed to withstand a load for a long period, and has a good impact resistance. The tank weighing transducer is applicable for weighing the tank automatically for the long period. The tank weighing transducer has stable performance in use, and manual operation is not required in course of weighing.

These and other objectives, features, and advantages of the present invention will become apparent from the following detailed description, the accompanying drawings, and the appended claims.

1—supporting ring; 2—cover; 3—gasket; 4—locking screw; 5—weighing sensor; 6—circuit board; 7—battery; 8—base; 9—supporter nut; 10—supporter screw; 11—detachable supporter; 12—tank

DETAILED DESCRIPTION OF THE PREFERRED EMBODIMENT

Figure 1:
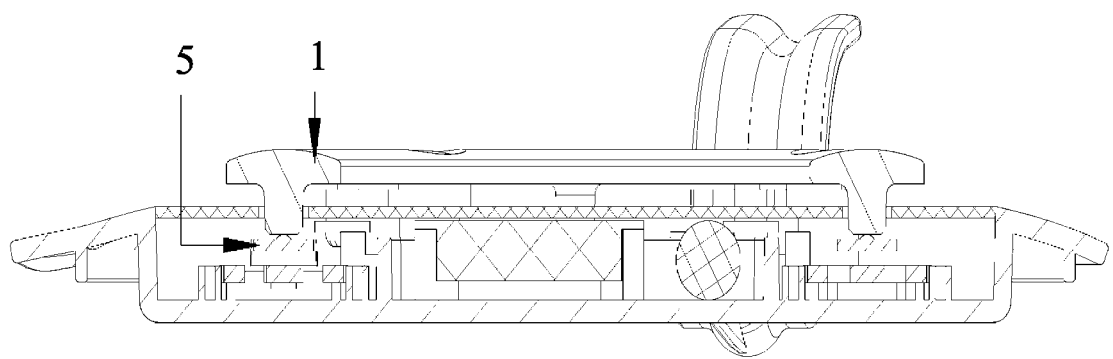
FIG. 1 is a sectional view of a weigher of a tank weighing transducer according to one embodiment of the present invention.
Figure 2:
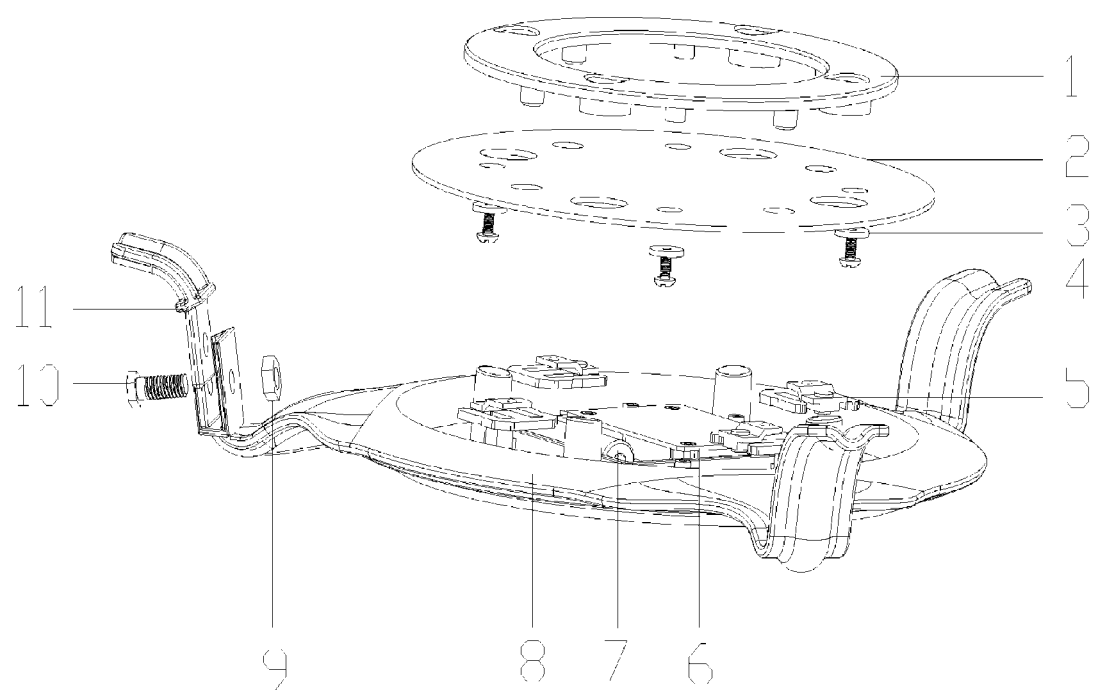
FIG. 2 is an exploded view of the weigher of the tank weighing transducer according to one embodiment of the present invention.

Referring to FIG. 1 and FIG. 2, a supporting ring 1 and a cover 2 are connected via a locking screw 4 and a gasket 3, to form a first part. A weighing sensor 5 and a circuit board 6 are fixed on a base 8 via the locking screw 4, to form a second part. A battery 7 is put in a battery container on the base 8. The first part is connected with the second part by connecting the cover 2 with the base 8 via the locking screw 4, to form a weigher. The weigher is received in a locking ring, which is provided at a bottom of a tank 12. A detachable supporter 11 is fixed on the base 8 via a supporter nut 9 and a supporter screw 10. Thus, a tank weighing transducer is assembled.

Figure 3:
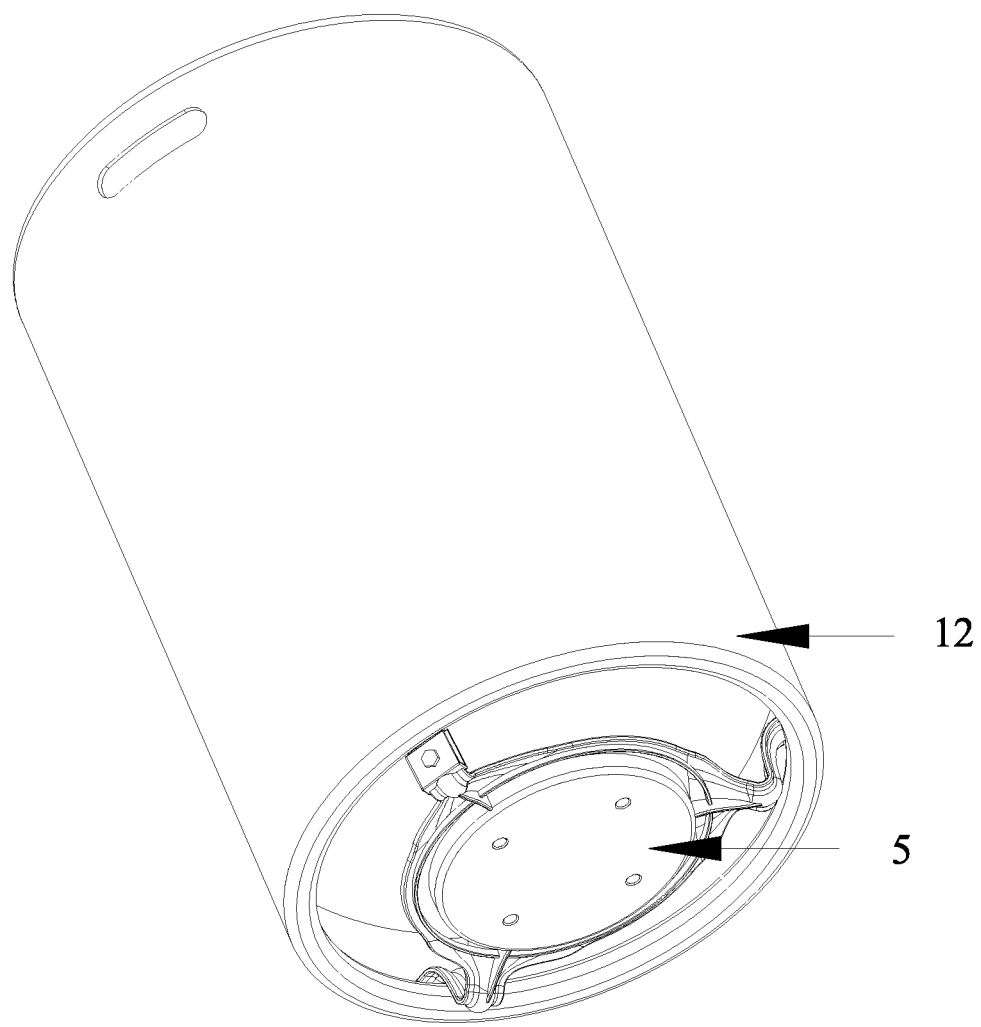
FIG. 3 is a perspective view of the tank weighing transducer according to one embodiment of the present invention.

Referring to FIG. 3, a weight of material in the tank 12 changes as the material is consumed. Therefore, in order to continuously monitor the weight of the material in the tank 12 for a long period, the circuit board 6 is programmed to detect the weight regularly at different intervals or detect the weight continuously. The data detected is then transferred to a system unit via a wireless module provided on the circuit board 6 in such a manner that the weight of the tank 12 is monitored continuously for the long period.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claim

What is claimed is:
1. A tank weighing transducer, comprising:
a supporting ring, a cover, a gasket, a locking screw, a weighing sensor, a circuit board, a battery, a base, a supporter nut, a supporter screw, and a detachable supporter, wherein the supporting ring and the cover are connected via the locking screw and the gasket, the weighing sensor and the circuit board are fixed on the base via the locking screw, the battery is disposed on the base, the cover and the base are connected via the lock- ing screw to form a weigher, and the detachable supporter is fixed on the base via the supporter nut and the supporter screw.

2. The tank weighing transducer as recited in claim 1, wherein the weigher is received in a space provided in a bottom of a tank.

3. The tank weighing transducer as recited in claim 1, wherein the circuit board is adapted for sending out weight data via a wireless module provided on the circuit board in such a manner that a weight of a tank is monitored continuously for a period.

4. The tank weighing transducer, as recited in claim 3, wherein the circuit board is programmed to detect the weight of the tank regularly at different intervals or detect the weight continuously.

5. A method for assembling a tank weighing transducer, comprising:
  connecting a supporting ring and a cover via a locking screw and a gasket;
  fixing a weighing sensor and a circuit board on a base via the locking screw;
  disposing a battery on the base;
  connecting the cover with the base via the locking screw to form a weigher; and
  fixing a detachable supporter on the base via a supporter nut and a supporter screw.

6. The method for assembling the tank weighing transducer, as recited in claim 5, wherein the weigher is received in a space provided in a bottom of a tank.

7. The method for assembling the tank weighing transducer as recited in claim 5, wherein the circuit is adapted for sending out weight data weight data via a wireless module provided on the circuit board in such a manner that a weight of a tank is monitored continuously for a period.

8. The method for assembling the tank weighing transducer as recited in claim 7, wherein the circuit board is programmed to detect the weight of the tank regularly at different intervals or detect the weight continuously.

* * * * *